(12) United States Patent
Good et al.

(10) Patent No.: US 7,217,024 B2
(45) Date of Patent: May 15, 2007

(54) OPTICAL DISPERSION SYSTEM

(76) Inventors: Mark Good, 2206 Page Ave., Orlando, FL (US) 32806; John Good, 2206 Page Ave., Orlando, FL (US) 32806

( * ) Notice: Subject to any disclaimer, the term of this patent is extended or adjusted under 35 U.S.C. 154(b) by 290 days.

(21) Appl. No.: 10/449,864

(22) Filed: May 30, 2003

(65) Prior Publication Data

US 2004/0114394 A1    Jun. 17, 2004

Related U.S. Application Data (60) Provisional application No. 60/384,264, filed on May 30, 2002.

(51) Int. Cl.
*G09F 13/04* (2006.01)

(52) U.S. Cl. .................. 362/604; 362/812; 362/554; 362/558; 362/556; 40/204

(58) Field of Classification Search .............. 362/554, 362/558, 556, 600; 40/454, 579, 547, 575, 40/204
See application file for complete search history.

(56) References Cited

U.S. PATENT DOCUMENTS

| | | | |
|---|---|---|---|
| 1,939,288 A * | 12/1933 | Allison | ............... 40/545 |
| 2,707,346 A | 5/1955 | Fuller, Jr. | |
| 2,998,667 A * | 9/1961 | Darnell | ............... 40/564 |
| 4,026,635 A * | 5/1977 | Wallin | ............. 359/438 |
| 4,807,092 A | 2/1989 | Hasegawa | |
| 4,922,384 A * | 5/1990 | Torrence | ............... 362/31 |
| 4,976,057 A | 12/1990 | Bianchi | |
| 4,989,126 A * | 1/1991 | Preuss | ............. 362/351 |
| 5,214,870 A | 6/1993 | Cohen | |
| 5,228,223 A * | 7/1993 | Lan | ............... 40/204 |
| 5,231,689 A | 7/1993 | Reidinger | |
| 5,247,600 A | 9/1993 | Williams et al. | |
| 5,588,235 A | 12/1996 | Juchymenko et al. | |
| 5,761,837 A | 6/1998 | Tryon et al. | |
| 5,992,068 A | 11/1999 | de Saro | |
| 6,024,476 A | 2/2000 | Wakeman | |
| 6,445,373 B1 * | 9/2002 | Yamamoto | ............. 345/102 |

\* cited by examiner

*Primary Examiner*—Sandra O'Shea
*Assistant Examiner*—Anabel Ton
(74) *Attorney, Agent, or Firm*—Terry M. Sanks, Esq.; Beusse Wolter Sanks Mora & Maire, P.A.

(57) ABSTRACT

An optical dispersion system comprising a light source where light is directed to be illuminated from the system, a prismatic magnifier to expand a coverage area of the light illuminated from the light source and to deflect and magnify the light, and a removable front panel having a cutout area through which the light source illuminates.

19 Claims, 7 Drawing Sheets

OPTICAL DISPERSION SYSTEM

This application claims priority of Provisional Patent Application Ser. No. 60/384,264, filed on May 30, 2002.

BACKGROUND OF THE INVENTION

This invention relates to an illuminated system and, more specifically, to an optical dispersion system, wherein light provided through fiber optic fibers are magnified, reflected and refracted to produce a more brilliantly illuminated appearance.

With the advent of fiber optic lighting, many devices which have used other forms of lighting have begun moving away from other lighting systems, such as neon lights, to provide color-specific illumination of signs. Fiber optic lighting is used for many various types of signs. Such examples include signs that advertise businesses, billboards, and channel letters.

Typically, fiber optic lighting is used under two different concepts. The first is using the end, tip, or end glow, of a fiber strand, with a plurality of other fiber strands to produce the desired features of the sign. Under this concept, a greater number of strands are needed to produce the illustrated effect desired by a user. Viewing the a sign using fiber optic strands in this configuration, an observer can see the individual strands appearing as dots when viewed from certain distances from the sign.

Under another concept, instead of using the end of the fiber optic cables, the longitudinal side of a strand, or a bundle of strands are used to provide the desired illumination, referred to as side glow. Applicant believes that this concept is limiting, since even though this approach may be ideal for spelling out words, the amount of lamination is limited.

In view of the perceived limitations of the current state of the art, manufacturers of products, such as, but not limited, signs, including billboards, would benefit from an illumination system in which fiber optics are used to provide illumination. Such individuals would also benefit from fiber optic signage wherein the illumination emitting from a sign is uniform, even when viewed from various angles. Additionally users would benefit from an illumination system that consumes less electricity since fewer optical strands are illuminated which in turn is more environmentally beneficial since fewer strands would need to be manufactured.

BRIEF DESCRIPTION OF THE INVENTION

The present invention is directed to an optical dispersion system to provide a broader coverage of illuminated light as well as a decorative appearance of the illuminated. This invention also provides for uses where less fiber optic strands are required to adequately provide illumination, which also results in environmental benefits. Towards this end, an optical dispersion system is disclosed comprising a light source where light is directed from it to be illuminated from the system. A prismatic magnifier to is also provided to expand a coverage area of the light illuminated from the light source and to deflect and magnify the light. A removable front panel having a cutout area through which said light source illuminates is also provided.

In another preferred embodiment, an optical dispersion system is disclosed with a reverse weed panel with elements removed for a light to illuminate therethrough. A clear panel connected to the reverse weed panel is also included. A prismatic magnifier panel is located adjacent to the clear panel. A grid panel with a plurality of holes formed therethrough at a defined distance from said prismatic magnifier panel is also included. The side of the grid panel facing towards said prismatic magnifier panel has a reflective surface. A plurality of fiber optic strands with a first end fitting within the plurality of holes in the grid panel is included. A light source that provides light that is emitted through a second end of the plurality of fiber optic strands is also provided.

In another preferred embodiment an improvement to an optical dispersion system is disclosed. The improvement is for a dispersion system having a light source, plurality of optical fiber strands to project a light from the light source, and a mounting device for the optical fibers. The improvement comprises a reflective surface on the mounting device wherein the reflective surface reflects light that is emitted towards the mounting device towards an optical dispersion element.

BRIEF DESCRIPTION OF THE DRAWINGS

The invention itself, both as to organization and method of operation, may best be understood by reference to the following description in conjunction with accompanying drawings, in which like numbers represent parts throughout the drawings and in which.

DETAILED DESCRIPTION OF THE INVENTION

With reference to the figures, exemplary embodiments of the invention will now be described. The scope of the invention disclosed is applicable to a plurality of uses, such as but not limited to the entertainment industry, children's lighted toys, custom art, etc. Thus, even though embodiments are described specifically to illuminated signs, the present invention is applicable to other uses or applications such as, but not limited to, architectural lighting such as interior and exterior lighting of residential homes, office complexes and/or other buildings, illuminated toys, and/or any other devices or uses which would benefit from illumination. Similarly, the same or other embodiments of the optical dispersion may be used for other uses, including landscaping, such as illuminating sidewalks, pools of water, waterfalls or any other area that needs to be illuminated, including underwater applications. Furthermore, though the present invention is disclosed specific to fiber optic lighting, other forms of lights, such as light emitting diode lighting and laser lighting, but not limited to these forms of lighting, are also applicable to the present invention.

Figure 1:
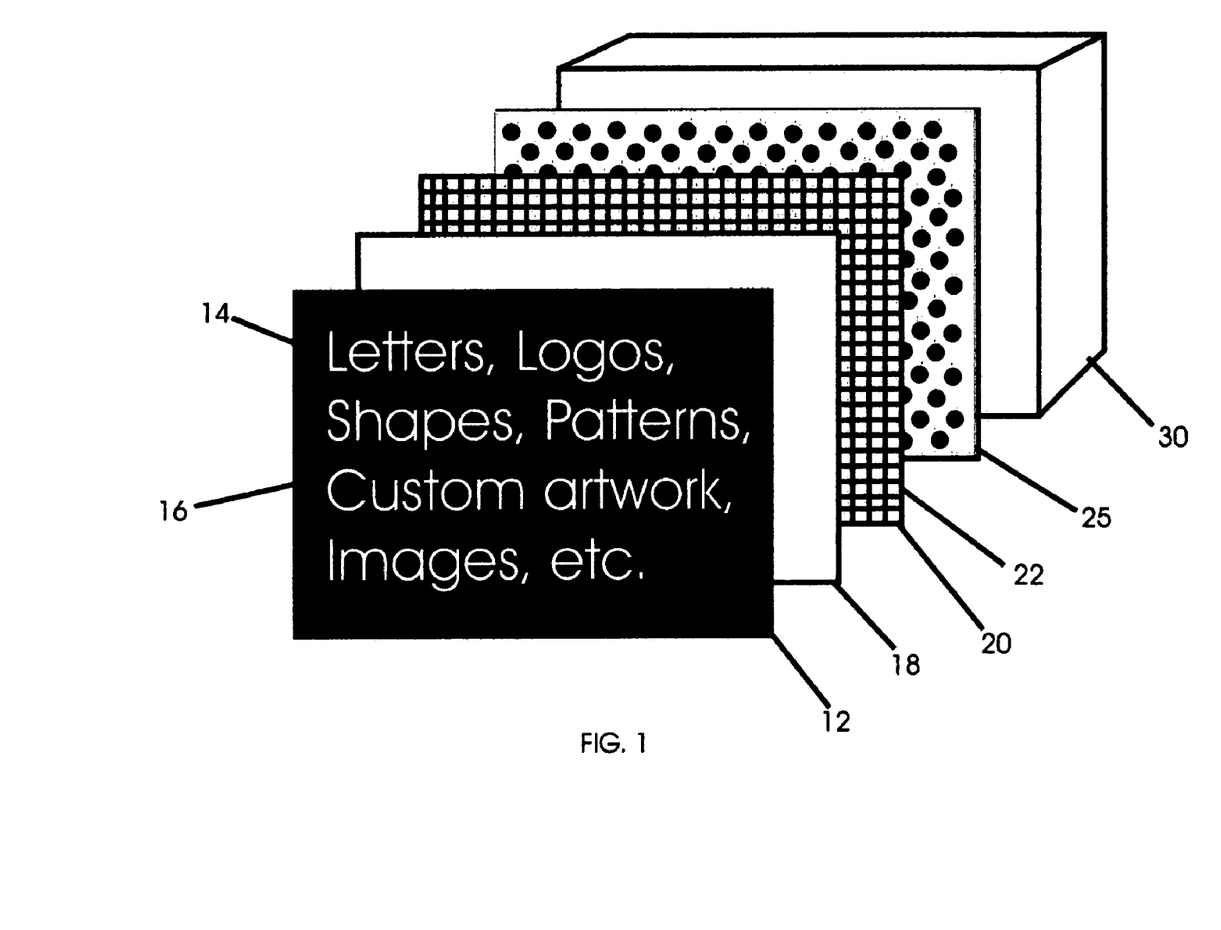
FIG. 1 is an exemplary embodiment of a perspective view of the elements that comprise sign part of the optical dispersion system.

FIG. 1 illustrates the various elements that comprise the actual sign of the present invention. As illustrated, a front panel is provided. In a preferred embodiment, the front panel is a reverse weed panel or, in other words, a panel through which openings are provided where letters, logos, shapes, patterns, and/or custom artwork is provided. Thus, light can be illuminated through the open areas, but not through the parts of the panel which do not have openings. Behind the front panel is a second panel, typically a clear panel, such as Plexiglas. The front, or reverse weed panel, is flush against the Plexiglas panel, wherein in a preferred embodiment, the two panels 12, 18 are adhered together. In another preferred embodiment, instead of having a first panel 12, a stencil, mask, and/or silk screen is applied directly to the second panel 18.

The third panel 20 is a prismatic magnifier panel 20. In a preferred embodiment, the front side, or side facing towards the second panel 18 of the prismatic magnifier panel 20, is a smooth, flat surface. The backside of the prismatic magnifier panel 20 is a uniform grid system which has concave patterns wherein the patterns within each individual grid is prismatic in nature in that it redirects the light a plurality of directions which magnifies the illumination of the light and deflects the light. In a preferred embodiment, each grid 22 is between ¼" to 1" and in a preferred embodiment, a ⅜" pattern is considered optimum. By utilizing the prismatic magnifying panel 20, fewer fiber optic strands 27 are needed to illuminate the full surface of a sign, since this panel 20 spreads the illuminated light over a broader area. Furthermore, the illumination provided is more of a diamond sparkling effect, also due to the prismatic magnifying characteristics of the panel 20.

A fourth panel 25 is a fiber optic alignment grid panel 25. In a preferred embodiment, the fiber optic alignment grid 25 is provided to hold ends of fiber optic strands 27 in place, preferably in a uniform configuration. As one skilled in the art will readily recognize, if other light forms are used, such as light emitting diodes or laser lights, these emitters can also be held by an alignment grid 25, as disclosed herein. In a preferred embodiment, the ends of the fiber optic strands 27 are held in place through an opening 29 by glue, such as epoxy, where the ends of the strands 27 are flush with the surface of the panel 25 facing towards the prismatic magnifying panel 20. In another preferred embodiment, the ends of the fiber optic strands extend beyond the panel, such as approximately ¼".

Figure 2:
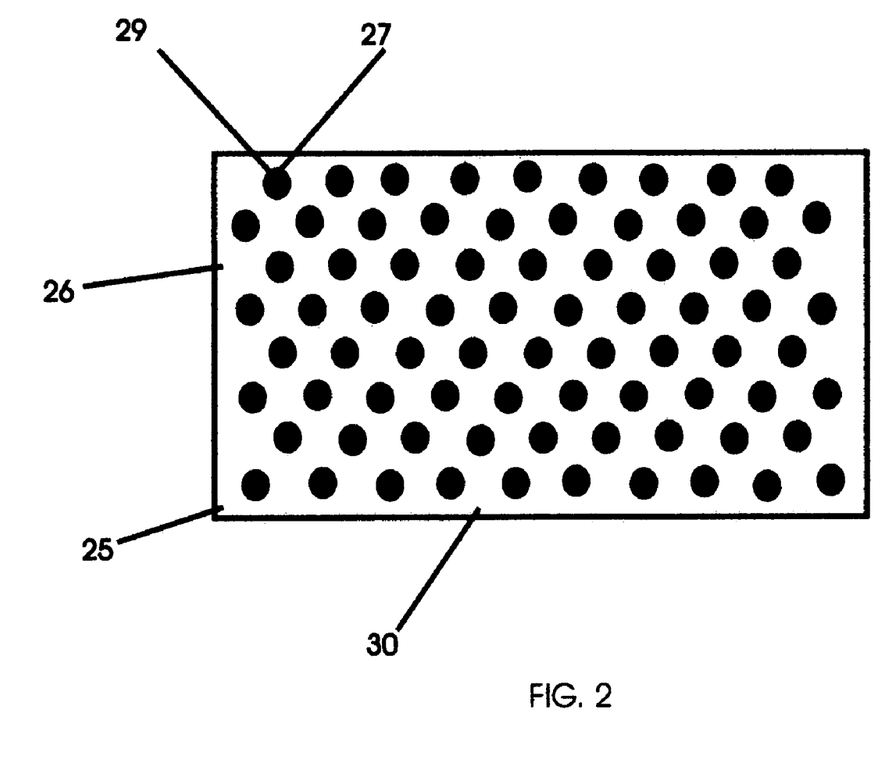
FIG. 2 is an exemplary embodiment of a fiber optic alignment grid.

As further illustrated in FIG. 2, a uniform alignment grid 26 is provided, such as a diagonal pattern, wherein the spacing between the holes 29 can range from ⅛" to ¾", where a preferred distance is ½". The side of the fiber optic alignment grid panel 25 facing towards the concave side of the third panel 20 is a reflective surface, such as a mirror, 30 wherein light reflected back from the prismatic magnifier panel 20, or in other words is not emitted through the prismatic magnifier panel 20, but emits back towards the fiber optic alignment grid 26 and is then reflected, or bounced, back towards the prismatic magnifier panel 20. The fifth element 30, disclosed in FIG. 1, is an extrusion panel 30. In one preferred embodiment, the extrusion element 30 is used to support all of the panels 12, 18, 20, 25 discussed above and to hold a lighting source 32, discussed below.

Figure 3:
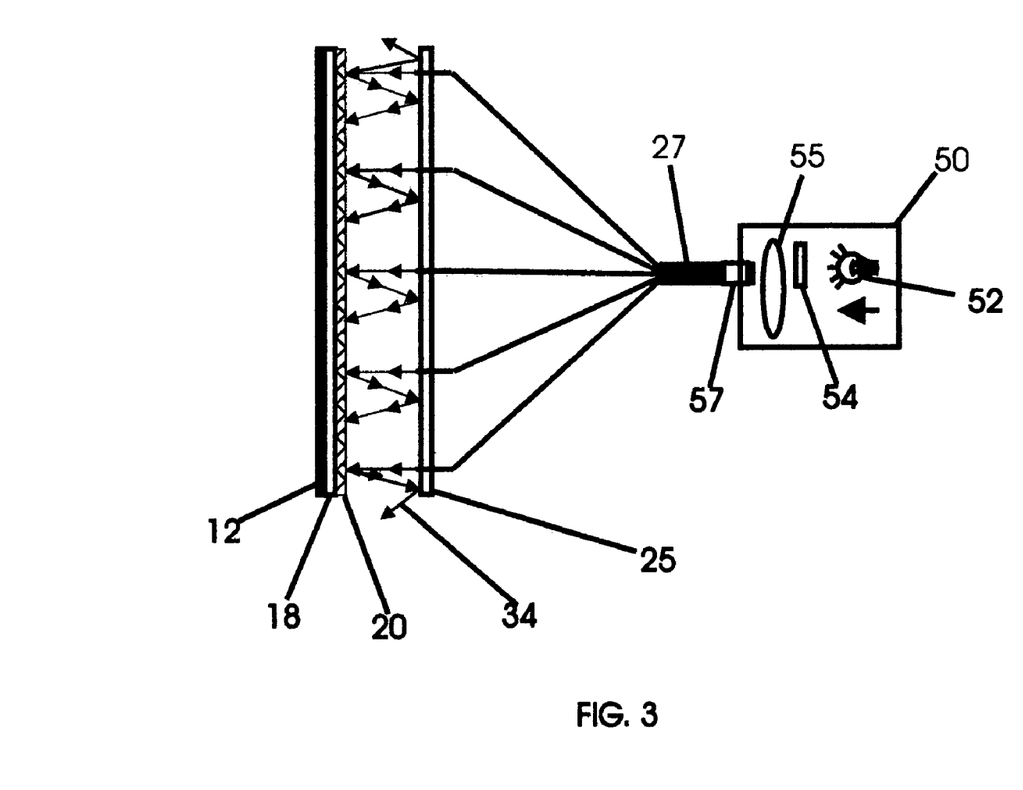
FIG. 3 is an exemplary embodiment of a side view of the optical dispersion system with the extrusion element comprising reflective surfaces.

In another preferred embodiment, disclosed in FIG. 3, the extrusion element 30 fits around the above discussed panels 12, 18, 20, 25 where the inner side walls 34 of the extrusion element 30 are reflective surfaces, or mirrors, which also returns, reflects, or emits, light reflected from the back of the prismatic magnifying panel 20 back towards the prismatic magnifying panel 20. In a preferred embodiment, the sides 34 are at an angle to reflect the light back towards the prismatic magnifying panel 20. In another preferred embodiment, only parts of the sides 34 are reflective and the reflective parts are positioned to best reflect light back towards the prismatic magnifying panel 25.

Figure 4:
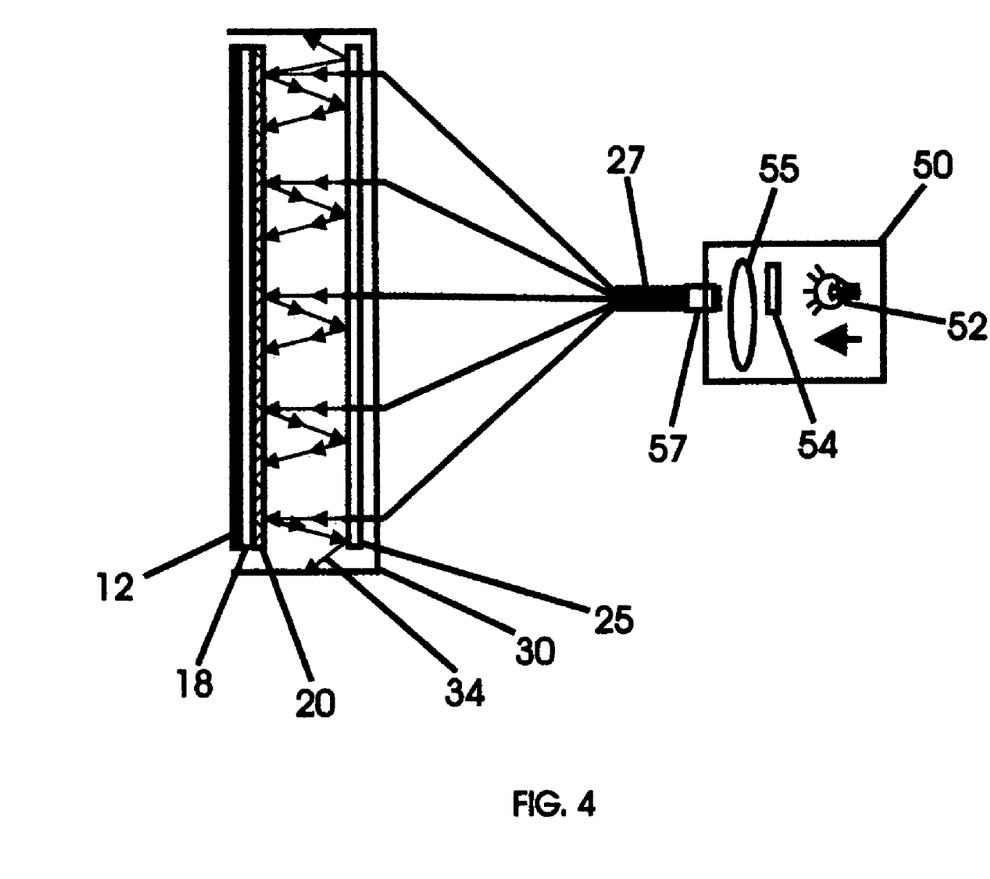
FIG. 4 is an exemplary embodiment of a side view of the optical dispersion system.
Figure 5:
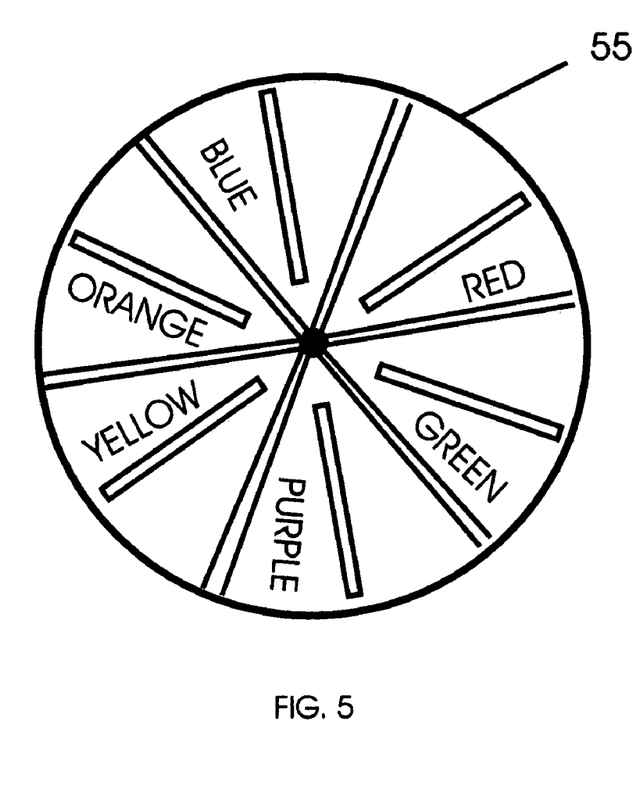
FIG. 5 is an exemplary embodiment of a preferred color wheel.

FIG. 4 is a side view of the present invention. As is further illustrated in FIG. 4, a light-emitting device 50 is provided wherein a light 52 is contained within the light emitting source 50. The light 52 is directed towards a heat-absorbing glass 54, then towards a color wheel 55. A preferred color wheel, illustrated in FIG. 5, allows for all optic strands 27 to be illuminated by the same color at a given time. A fiber head 57 is provided that holds a plurality of fiber strands 27. One end 40 of the fiber strands 27 is placed on the other side of the color wheel 55 furthest from the light source 52. The second end of the strands 27 is placed through the plurality of holes 29 provided in the fiber optic alignment grid 26. Once in place, in a preferred embodiment, the strands 27 are glued, or epoxied into place.

As further illustrated in FIG. 4, light emitting from the fiber ends 40 of the strands 27 illuminate onto the concave side of the prismatic magnifier panel 20. Because of the reflective characteristics of the prismatic magnifying panel 20, as discussed above, not all light is emitted through the panel 20, but instead some of the light is reflected back towards the fiber optic alignment grid 26. The reflective characteristics, which have a mirror effect, of the fiber optic alignment grid panel 25 reflect the light from the prismatic magnifying panel 20 back towards the prismatic magnifying panel 20. A preferred distance, such as 40 mm, between the alignment grid panel 25 and the back of the prismatic magnifying panel 20 provides optimum transmission of light from the fiber ends 40 all the way through the reverse weed panel 12.

In operation, such as when used with a road side bill board, the extrusion element 30, light source, fiber alignment panel 25, prismatic magnifier panel 20, and clear panel 8 can remain in place and when a new sign or advertisement is desired, the first panel 12 can be replaced. In another preferred embodiment, the clear panel 18 and first panel 12 are replaceable when the first panel is affixed to the clear panel 18, or a stencil is applied to the clear panel 18.

Figure 6:
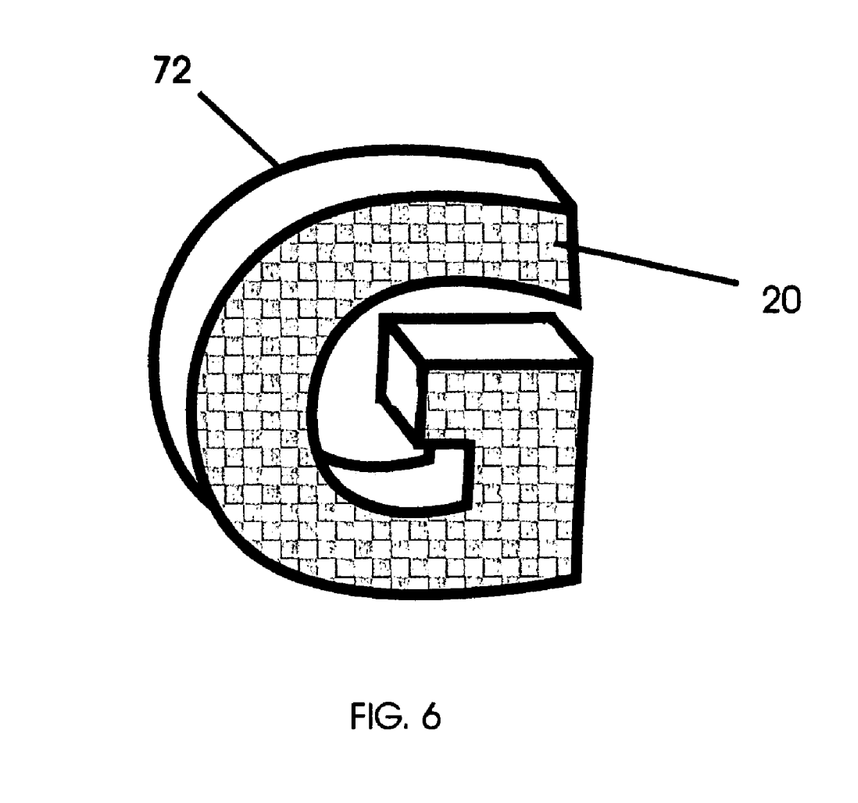
FIG. 6 is an exemplary embodiment of a sign using the optical dispersion system.
Figure 7:
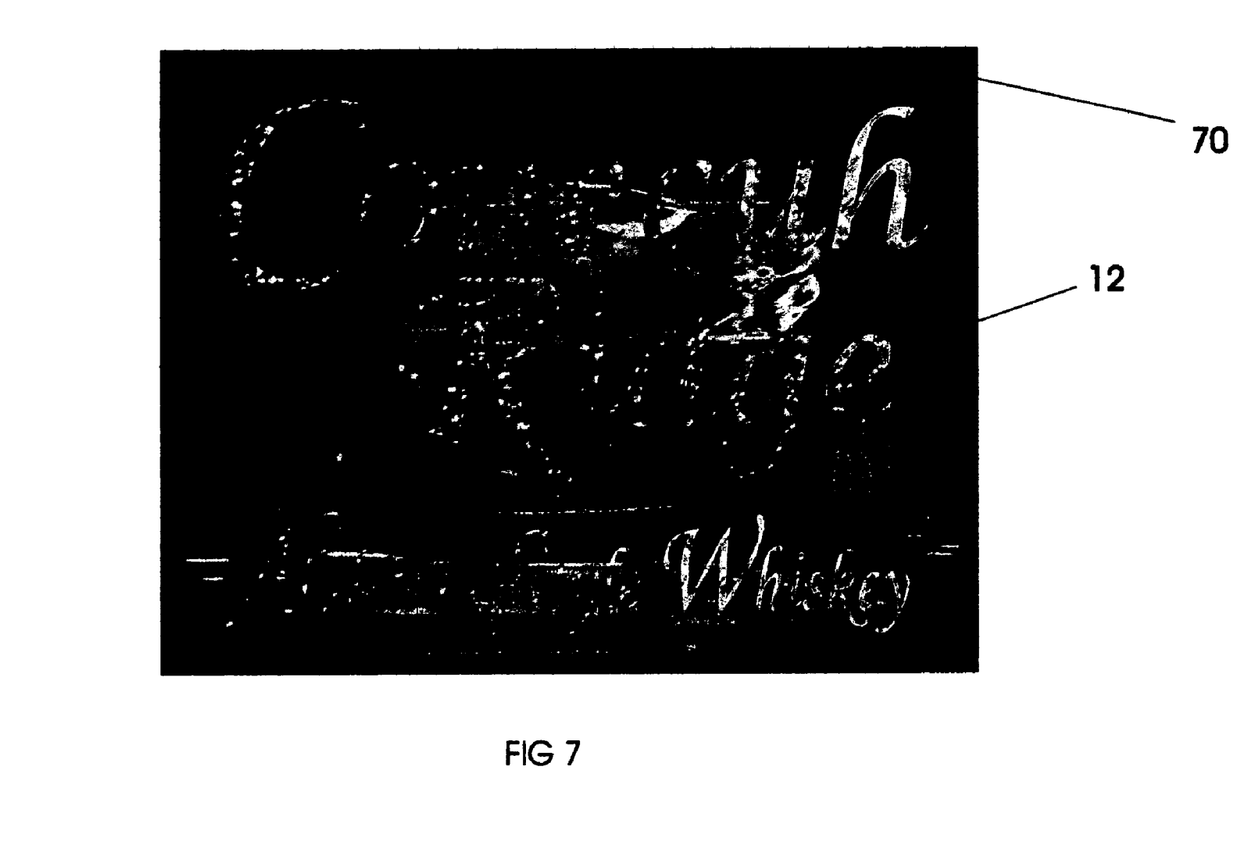
FIG. 7 is an exemplary embodiment of a channel letter using the optical dispersion system.

FIGS. 6 and 7 illustrate exemplary uses of the present invention used as signs. FIG. 6 is an illustration of a sign 20 where an image of a product 20 is on the reverse weed panel 12 where the words are cut through the panel and are illuminated pursuant to the present invention. One skilled in the art will recognize that the present invention could be used to illuminate other parts of an image on a sign, such as ice, jewelry (such as facets of a diamond), fire burning, water sparkling, or other items in an image. As illustrated in FIG. 7, the present invention can also be used to illuminate channel letters 72.

While the invention has been described in what is presently considered to be a preferred embodiment, many variations and modifications will become apparent to those skilled in the art. Accordingly, it is intended that the invention not be limited to the specific illustrative embodiment, but be interpreted within the full spirit and scope of the appended claims.

We claim as our invention:

1. An optical dispersion system, said system comprising:
   a light source where light is directed to be illuminated from said system;
   a removable front panel having a signage cutout area through which said light source illuminates in a dispersion pattern away from said system;
   a prismatic magnifier panel, having a front side and a back side and positioned between said light source and said removable front panel, to expand a coverage area of said light illuminated from said light source and to deflect and magnify said light before said light exits said system;
   a reflective panel having a front side reflective surface, and outer edges, that is facing towards said prismatic magnifier panel wherein said light is directed from said light source, at least one of therethrough a hole formed therethrough said reflective panel and around an outer edge of said reflective panel, and towards said prismatic magnifier panel so that said light deflected by said prismatic magnifier panel is reflected back towards said prismatic magnifier panel; and
   an enclosure proximate an area created by placement of said reflective panel, said removable front panel, and said prismatic magnifier panel.

2. The optical dispersion system of claim 1 wherein said reflective panel, said prismatic magnifier panel and said removable front panel are positioned in parallel and apart from each other.

3. The optical dispersion system of claim 1 wherein said front side reflective surface of said reflective panel is a mirror.

4. The optical dispersion system of claim 1 wherein said light is passed through a color filter before it is illuminated from said system.

5. The optical dispersion system of claim 1 wherein said light source is at least one a light to illuminate a fiber optic strand, a light emitting diode, and a laser light source.

6. The optical dispersion system of claim 1 wherein said reflective panel further comprises openings therethrough said reflective panel to allow light from said light source to pass therethrough the reflective panel from said light source.

7. The optical dispersion system of claim 1 further comprises a light directing element guiding light generated by said light source at least one of therethrough said reflective panel and around said outer edge of the reflective panel.

8. The optical dispersion system of claim 1 further comprises attachment elements proximate said front, side reflective surface of said reflective panel to hold at least one of said light source and a light directing element directing light generated by said light source at least one of therethrough said reflective panel and around said outer edge of said reflective panel.

9. The optical dispersion system of claim 1 wherein said enclosure further comprises a reflective surface on a side of said enclosure facing into said area being enclosed.

10. The optical dispersion system of claim 1 further comprising a bundle of fiber optic strands to direct said light from said light source towards said back face of said prismatic magnifier panel which results in said light being illuminated from said system.

11. The optical dispersion system of claim 10 further comprises a plurality of holes formed therethrough said reflective panel in a uniform grid pattern through which individual strands of said bundle of fiber optic strands are fitted.

12. The optical dispersion system of claim 1 wherein said prismatic magnifier panel comprises a uniform prismatic pattern of grids.

13. The optical dispersion system of claim 12 wherein each individual grid of said grids has a concave shape on said back side.

14. An optical dispersion system, said system comprises:
    a reverse weed panel with elements removed for a light to illuminate therethrough;
    a clear panel connected to said reverse weed panel;
    a prismatic magnifier panel adjacent to said clear panel;
    a grid panel with a plurality of holes formed therethrough at a defined distance from said prismatic magnifier panel;
    a reflective surface on a side of said grid panel facing towards said prismatic magnifier panel;
    a plurality of fiber optic strands with a first end fitting within said plurality of holes in said grid panel; and
    a light source that provides light that is emitted through a second end of said plurality of fiber optic strands.

15. The optical dispersion system of claim 14 wherein said fiber optic strands are flush with a surface of said grid panel facing towards said prismatic magnifier panel.

16. The optical dispersion system of claim 14 further comprising a color filter to change a color illuminated from said system.

17. The optical dispersion system of claim 14 wherein said reverse weed panel and said clear panel are an integrated panel.

18. The optical dispersion system or claim 5 wherein a plurality of said light emitting diodes are individually fitted within an individual hole of said plurality of holes formed therethrough said reflective panel.

19. A method of Illuminating a light through an optical dispersion system, said method comprising the following stops:
    illuminating light by at least one of through or from a reflective panel having at least one of holes for said light to pass therethrough or attachment devices to hold a light emitter;
    illuminating said light against a prismatic magnifier panel wherein said light is at least one of transmitted through said prismatic magnifier panel and deflected back towards said reflective panel;
    reflecting said deflected light back towards said prismatic magnifier panel with said reflective panel; and
    illuminating said light through a removable front panel having a signage cutout area.

* * * * *